July 16, 1968  L. E. ALLEN  3,392,832

FAN ASSEMBLY FOR HARVESTING MACHINERY

Filed March 2, 1966

Inventor
Lawrence E. Allen
By Kenneth Luckliver
Attorney 3,392,832
FAN ASSEMBLY FOR HARVESTING MACHINERY
Lawrence E. Allen, Indepedence, Mo., assignor to Allis-
 Chalmers Manufacturing Company, Milwaukee, Wis.
Filed Mar. 2, 1966, Ser. No. 531,279
6 Claims. (Cl. 209—318)

ABSTRACT OF THE DISCLOSURE

An apparatus for automatically removing debris in a combine harvester, particularly the debris which collects in the angled pocket formed between a blower and its outlet tube in such harvester.

---

This invention relates generally to combine harvesters and more particularly to improved fan means used in cleaning and separating the harvested grain.

Harvesting machinery provided with one or more fans in the separator and cleaning system have a problem of chaff, dust, grain or seed and debris accumulating on the fan housing. This material will collect moisture and cause rust or corrosion and if allowed to accumulate, it can become so tightly packed that extensive damage to the fan and cleaning shoe housing will result.

Quite often it is difficult to get at the points of collection due to belts, pulleys and other mechanisms and accordingly because it is difficult to clean away this debris, it often is not done to the detriment of the machine.

An object of this invention is to provide an improved fan housing which will continually remove such debris from the area above the fan housing.

Another object of this invention is to provide an improved fan housing which will continually remove such debris from the area above the fan housing and also prevent the loss of grain or seeds contained in this debris.

Other objects and advantages will become apparent from the following description when taken in conjunction with the accompanying drawings in which.

Figure 2:
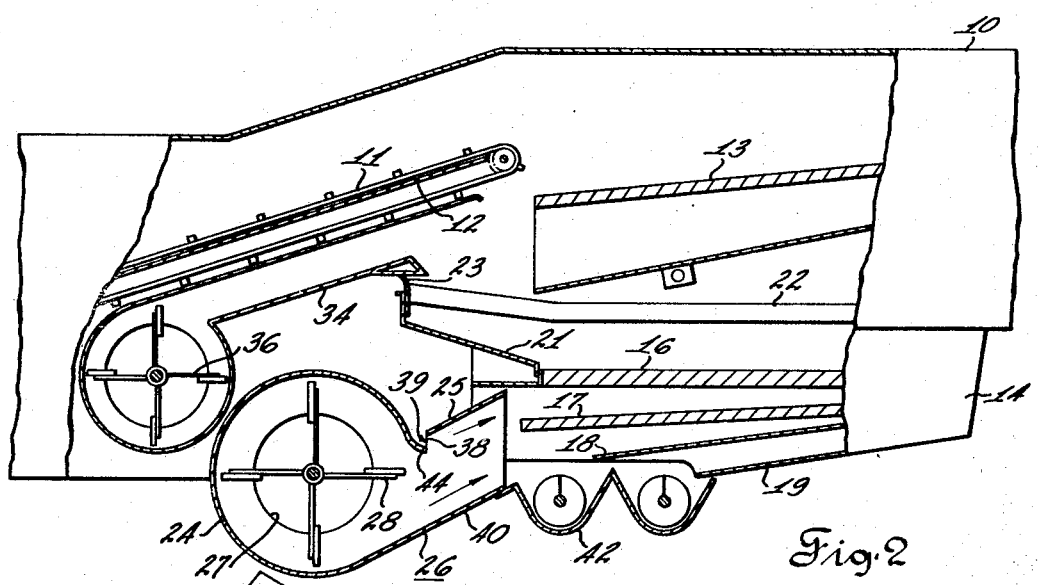
FIG. 2 is a view similar to FIG. 1 showing a separator utilizing two fans.
Figure 3:
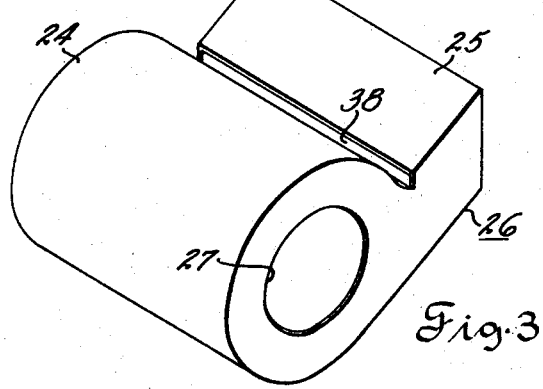
FIG. 3 is a perspective view of the improved fan housing and duct shown in FIG. 2.

Referring to FIG. 2, there is shown a separating and cleaning mechanism of a conventional combine including a separator housing 10 operatively mounting a raddle conveyer 11 moving over a floor 12 for moving threshed material to a reciprocating straw walker 13 which shakes the threshed material, permitting grain or seeds to drop through the straw walker while the straw is moved to the right and out of the combine onto the ground.

Beneath straw walker 13, a cleaning shoe housing 14 is attached to separator housing 10 for oscillation relative thereto by means (not shown). For a more detailed description of the type of combine comprehended by this invention, reference may be had to U.S. Patent 2,937,647, relating to Grain Separating Mechanism for Combine.

Cleaning shoe housing 14 supports a chaffer sieve 16, a cleaning sieve 17, a clean grain bottom 18, a tailings bottom 19, a cleaning shoe grain pan 21, and flexible wiper strips 22 and 23. A cleaning fan housing 24 is carried by separator housing 10. Fan housing 24 includes an air duct 26, an air intake opening 27 and encloses a conventional fan rotor 28.

Figure 1:
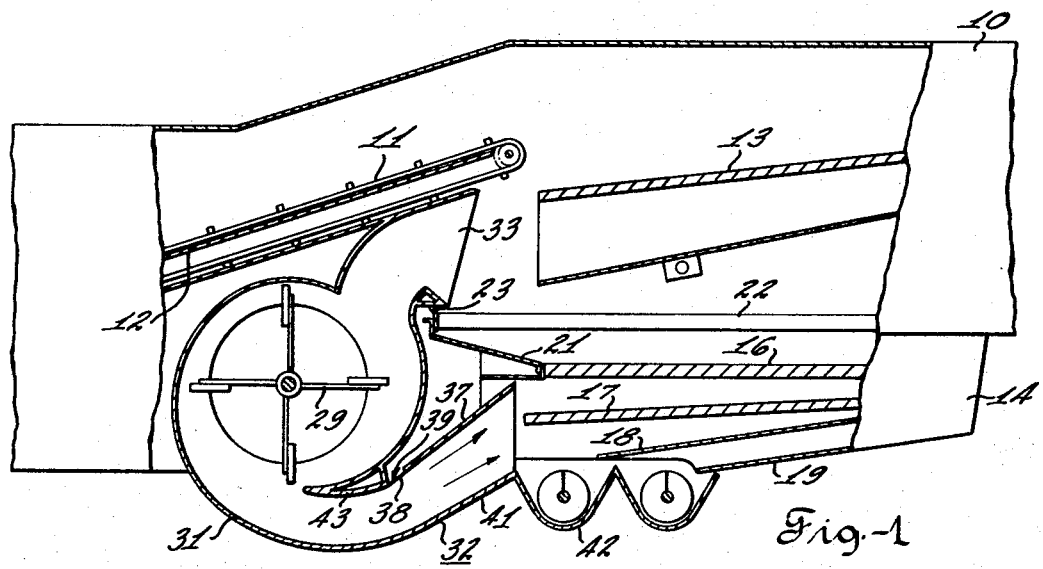
FIG. 1 is a side elevation of a combine harvester, with parts of the housing broken away to show the internal arrangement of the separating and cleaning mechanism embodying the present invention.

Referring to FIG. 1, there is shown a similar separator and cleaning mechanism with the exception that a single fan rotor 29 is employed in a housing 31 attached to a lower air delivery duct 32 conducting air to cleaning shoe 14, and an upper duct 33 supplying air to straw walker 13.

Flexible wiper strips 22 shown in FIGS. 1 and 2, are attached to the sides of the upper portion of cleaning shoe housing 14 to maintain a sliding contact with the inside of separator housing 10. Wiper strip 23 is attached to the front side of grain pan 21 and has sliding contact with the lower side of separator air duct 33 in FIG. 1 or the lower side of air duct 34 of fan 36 which provides air for straw walker 13 in FIG. 2. The purpose of these wipers 22 and 23 is to prevent passage of material such as dust, chaff, grain or seeds during operation when shoe 14 is oscillating. Invariably a portion of this material finds its way past the wipers and falls on fan housing 24 and on upper wall 25 of air duct 26 in FIG. 2 or on upper wall 37 of duct 32 in FIG. 1.

To prevent this accumulation of debris, including grain or seeds, a slot or auxiliary air opening 38 is provided full width in the upper walls 25 and 37 of FIGS. 2 and 1, respectively. The debris will move by gravity assisted by the flow of air represented by arrow 39. The lighter particles such as dust and chaff will be acted upon by the air stream 39 and will be carried through the cleaning sieve 17 and chaffer 16 to the rear of the combine where it will be deposited on the ground. The heavier particles such as grain or seed will faill more rapidly through the air stream 39 to the bottom wall 40 (FIG. 2) or bottom wall 41 (FIG. 1) wherein the air stream is sufficient to cause the grain or seeds to slide rearwardly and be deposited in the clean grain conveyer housing 42.

The air flow 39 through slot 38 is accomplished by venturi action which results from directing the air stream generated by fans 28 and 29 to pass below the slots 38, thereby creating a low pressure or suction at the slots 38. Wind deflectors 43 and 44 are provided for this purpose as shown in FIGS. 1 and 2 respectively.

From the foregoing, it is now apparent that this invention provides an efficient and continuous method of preventing an accumulation of debris in the area above the fan housing and duct and also saves the grain and seeds contained in such debris.

The embodiments of the invention in which an exclusive property or privilege is claimed are defined as follows:

1. In combination in a combine harvester having fan means for supplying air for separating grain from chaff in said combine, said fan means including a power operated shaft with fan blades connected thereto, a generally cylindrical housing carried by said combine and positioned about said fan blades, air intake means for said fan means and located at the ends of said shaft, air outlet means joined to said housing and including a lower wall extending tangentially from said housing and having an upper wall extending generally parallel to said lower wall, side walls joining said lower and upper walls to form said air outlet means, the improvement comprising said upper wall being positioned in spaced removed relation to said housing for providing an auxiliary air intake opening and a deflector carried by said housing and positioned between said opening and said housing for directing air from said fan over said opening and through said outlet means.

2. The combination as recited in claim 1 and wherein the portion of said housing adjacent to said upper wall is configured to form said deflector so as to direct air from said fan means over and away from said auxiliary air intake opening.

3. The combination as recited in claim 2 and wherein said auxiliary air intake opening is coextensive with said outlet.

4. The combination as recited in claim 3 and wherein said housing is so configured as to form said deflector adjacent said opening for directing air from said fan means over said opening but away therefrom and through said outlet means to provide a venturi action to inspirate air through said opening and into the air stream of said fan means.

5. The combination as recited in claim 4 and wherein said opening is located beneath said separating means so that seeds and chaff escaping from said separating means will descend through said opening both by the action of gravity and by the air currents of said auxiliary air intake opening.

6. The combination as recited in claim 5 and wherein said lower wall joins with a grain conveyer means so that grain passing through said opening will be moved by said air stream over said lower wall and drop into said grain conveyer and chaff lighter than said grain will be air borne over said grain conveyer and out of said combine.

References Cited

UNITED STATES PATENTS

| | | | |
|---|---|---|---|
| 1,089,062 | 3/1914 | Landis | 230—114 |
| 3,023,901 | 3/1962 | Bulin | 209—318 X |

FOREIGN PATENTS 522,769  4/1921  France.

HARRY B. THORNTON, *Primary Examiner.*

TIM R. MILES, *Examiner.*